US012525382B2

(12) United States Patent
Calil et al.

(10) Patent No.: US 12,525,382 B2
(45) Date of Patent: Jan. 13, 2026

(54) SHUNT REACTOR WITH AUXILIARY POWER

(71) Applicant: Hitachi Energy Ltd, Zürich (CH)

(72) Inventors: Wilerson Calil, São Paulo (BR); Luiz Yamazaki, São Paulo (BR); Paulo Avelino, Vinhedo (BR); Nadia Amaral, São Paulo (BR); Daniel De Azevedo Bahcivanji, São Paulo (BR); Andre Souza, Guarulhos (BR); Hitochi Taninaga, São Paulo (BR)

(73) Assignee: HITACHI ENERGY LTD, Zürich (CH)

( * ) Notice: Subject to any disclaimer, the term of this patent is extended or adjusted under 35 U.S.C. 154(b) by 759 days.

(21) Appl. No.: 17/791,539

(22) PCT Filed: Oct. 28, 2020

(86) PCT No.: PCT/EP2020/080292
§ 371 (c)(1),
(2) Date: Jul. 8, 2022

(87) PCT Pub. No.: WO2021/139911
PCT Pub. Date: Jul. 15, 2021

(65) Prior Publication Data

US 2023/0041583 A1 Feb. 9, 2023

(30) Foreign Application Priority Data

Jan. 8, 2020 (EP) .................................... 20150693

(51) Int. Cl.
*H01F 27/20* (2006.01)
*H01F 27/02* (2006.01)
(Continued)

(52) U.S. Cl.
CPC ............ *H01F 27/20* (2013.01); *H01F 27/02* (2013.01); *H01F 27/22* (2013.01); *H01F 27/24* (2013.01); *H01F 27/28* (2013.01); *H01F 41/06* (2013.01)

(58) Field of Classification Search
CPC ........ H01F 27/20; H01F 27/025; H01F 27/02; H01F 27/10; H01F 27/105; H01F 27/12;
(Continued)

(56) References Cited

U.S. PATENT DOCUMENTS 1,955,313 A 4/1934 Sauer
1,984,996 A 12/1934 Sauer
(Continued)

FOREIGN PATENT DOCUMENTS

CN 101661826 A 3/2010
CN 109192460 A 1/2019
(Continued)

OTHER PUBLICATIONS

First Office Action, CN Patent Application No. 202080090037.1, mailed Feb. 28, 2025, 7 pages.
(Continued)

*Primary Examiner* — Mang Tin Bik Lian
(74) *Attorney, Agent, or Firm* — Sage Patent Group

(57) ABSTRACT

A shunt reactor includes a primary winding and a steel core. The steel core includes a bottom yoke, a top yoke, a first core limb, a second core limb, and a main limb. The first core limb, the second core limb and the main limb are arranged in parallel and in between the top yoke and the bottom yoke to form a support for a magnetic flux through the steel core. The primary winding is wound around the main limb. The shunt reactor further includes an auxiliary winding wound around the bottom yoke, top yoke, first core limb, or second core limb, and is configured to generate auxiliary power. The
(Continued)

primary and the auxiliary windings are electrically insulated from the steel core and from each other. A cooling fan is configured to be driven by the auxiliary power generated by the auxiliary winding.

19 Claims, 2 Drawing Sheets

(51) Int. Cl.

| | |
|---|---|
| ***H01F 27/22*** | (2006.01) |
| ***H01F 27/24*** | (2006.01) |
| ***H01F 27/28*** | (2006.01) |
| ***H01F 41/06*** | (2016.01) |

(58) Field of Classification Search

CPC ........ H01F 27/125; H01F 27/14; H01F 27/16; H01F 27/18; H01F 27/22; H01F 27/24; H01F 27/28; H01F 27/289; H01F 41/06; H01F 27/085; H01F 27/38; H01F 37/00

See application file for complete search history.

(56) References Cited

U.S. PATENT DOCUMENTS

| | | | | |
|---|---|---|---|---|
| 4,841,428 | A * | 6/1989 | Washburn | H01F 29/14 363/75 |
| 2004/0119577 | A1 | 6/2004 | Weger | |
| 2006/0220777 | A1 * | 10/2006 | Nakahori | H02M 3/28 336/212 |
| 2012/0124855 | A1 * | 5/2012 | Sicham | H01F 27/14 34/357 |
| 2013/0320940 | A1 * | 12/2013 | Dimitrovski | G05F 1/32 323/249 |
| 2014/0306788 | A1 * | 10/2014 | Umetani | H01F 27/385 336/173 |
| 2016/0285354 | A1 | 9/2016 | Handy et al. | |
| 2017/0324389 | A1 * | 11/2017 | Dimitrovski | H02J 1/02 |
| 2022/0208432 | A1 * | 6/2022 | Scala | H01F 27/32 |

FOREIGN PATENT DOCUMENTS

| | | | |
|---|---|---|---|
| EP | 1431986 | A1 | 6/2004 |
| EP | 2071596 | A | 6/2009 |
| FR | 550945 | A | 3/1923 |
| IN | 2011MUM03682 | A1 | 7/2013 |
| JP | 2013062936 | A | 4/2013 |

OTHER PUBLICATIONS

International Search Report and Written Opinion of the International Searching Authority, PCT/EP2020/080292, mailed Jan. 22, 2021, 14 pages.

Extended European Search Report dated Jul. 28, 2020 for European Patent Application No. 20150693.8, 8 pages.

* cited by examiner

SHUNT REACTOR WITH AUXILIARY POWER

CROSS REFERENCE TO RELATED APPLICATIONS

This application is a 35 U.S.C. § 371 national stage application of PCT International Application No. PCT/EP2020/080292 filed on Oct. 28, 2020, which in turn claims foreign priority to European Patent Application No. 20150693.8, filed on Jan. 8, 2020, the disclosures and content of which are incorporated by reference herein in their entirety.

TECHNICAL FIELD

The present disclosure relates to shunt reactors.

BACKGROUND

The main application of a shunt reactor is to supply inductive power to the electrical power grid in order to keep the voltage stability and power factor in an appropriate level. Shunt reactors are usually self-cooled equipment, i.e., only passive radiators are used to reduce oil temperature and similar with thermal siphon.

Shunt reactors dissipate energy due to Joule Effects, Hysteresis Losses and other principles. A general engineering goal is to reduce as much as possible if energy dissipated in equipment, e.g. by utilizing better quality materials and arranging components in an optimized layout.

In electrical power system, losses can be dozens of kilowatts, which makes cooling an important factor on the equipment design.

The cooling system of a shunt reactor can be more efficient if fans are combined with the passive radiators. When an auxiliary fan is combined with passive cooling for the shunt reactor, a higher flexibility to operate the shunt reactor under non-standardize conditions (such as over-voltage and high ambient temperature) without affecting the expected life time of the shunt reactors is achieved. A smaller footprint and lower mass of a shunt reactor can be provided, allowing a reduction of equipment costs, lower consumption of raw materials, such as cooper and steel, and lower cost for the civil works. On top of that, a better control over life expectancy can further be achieved.

When shunt reactors are equipped with fans, an external power source is generally needed for the cooling fans and other auxiliary devices. In shunt reactors located in remote areas, it may however be complex and expensive to get auxiliary power needed for cooling and other devices arranged in connection with the shunt reactor.

SUMMARY

One objective of the present disclosure is how to implement an auxiliary power source in a shunt reactor.

According to an aspect of the disclosure there is presented a shunt reactor comprising a primary winding and a steel core. The steel core comprises a bottom yoke, a top yoke, a first core limb, a second core limb, and a main limb. The first core limb, the second core limb and the main limb are arranged in parallel and in between the top yoke and the bottom yoke to form a support for a magnetic flux through the steel core. The primary winding is wound around the main limb to generate the magnetic flux through the steel core. The shunt reactor further comprises an auxiliary winding arranged wound around the bottom yoke, top yoke, first core limb, or second core limb, and is configured to generate auxiliary power from the magnetic flux generated by the primary winding. The primary and the auxiliary windings are electrically insulated from the steel core and from each other.

The shunt reactor may further comprise a cooling fan configured to be driven by the auxiliary power generated by the auxiliary winding.

The shunt reactor may further comprise a tank and cooling radiators, wherein the primary winding and the steel core are arranged inside the tank. The cooling radiators may be arranged on the outside of the tank and configured to passively cool the tank. The cooling fan may be configured to increase air circulation through the cooling radiators to improve their cooling efficiency.

The shunt reactor may further comprise a control cabinet arranged outside the tank, a feedthrough flange through the tank, and a power cable connected to the control cabinet and the auxiliary winding. The power cable may be arranged through the feedthrough flange.

The auxiliary winding may comprise a number of turns around the bottom yoke, top yoke, first core limb, or second core limb, the number of turns configured depending on a flux density in the steel core and an operating voltage of the cooling fan.

The auxiliary winding uses the magnetic induction inside the shunt reactor core as an auxiliary power source, which can be used for e.g. shunt reactor cooling. No external power source is thus not needed to power cooling fans.

Further, less cabling will be needed for auxiliary circuits and operation risks are reduced due to e.g. weather impacts on the cables and/or protection devices.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the disclosure are shown.

These aspects may, however, be embodied in many different forms and should not be construed as limiting; rather, these embodiments are provided by way of example so that this disclosure will be thorough and complete, and to fully convey the scope of all aspects of disclosure to those skilled in the art. Like numbers refer to like elements throughout the description.

Figure 1:
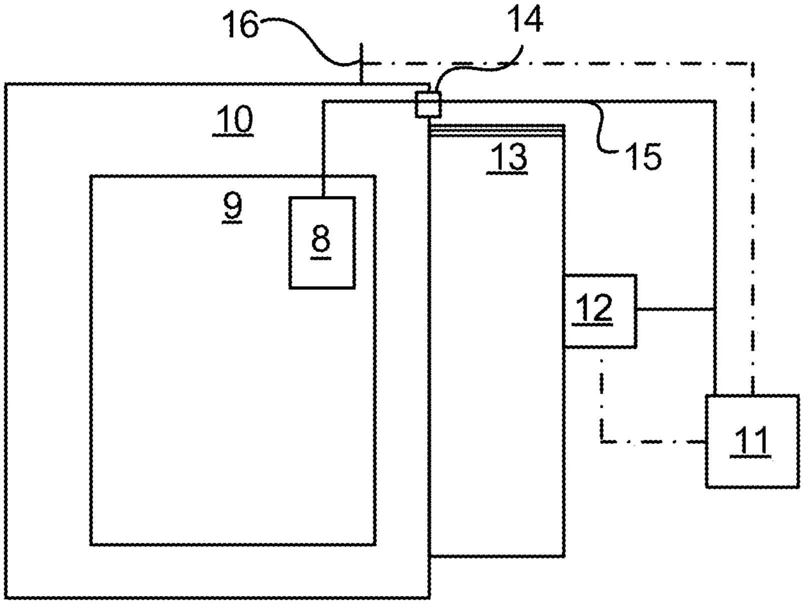
FIG. 1 is a diagram schematically illustrating an overview of a shut reactor according to an embodiment presented herein.
Figure 2:
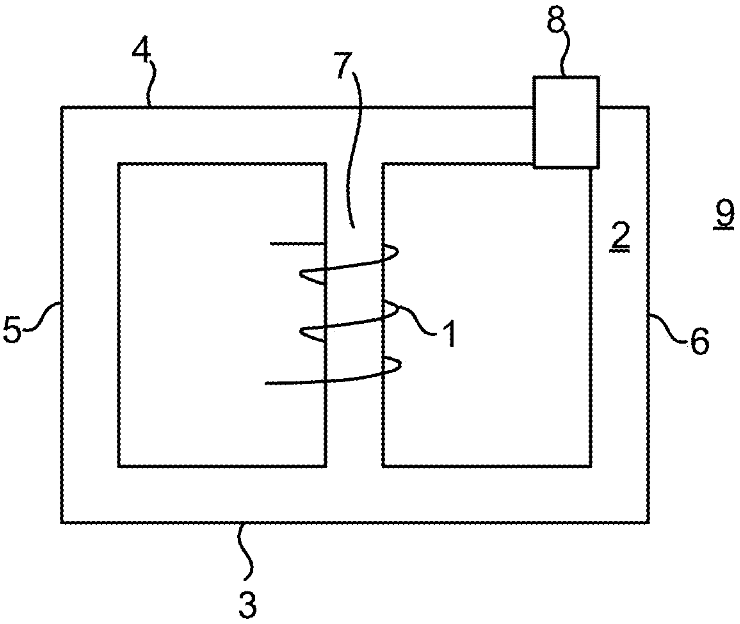
FIG. 2 is a diagram schematically illustrating part of the shunt reactor shown in FIG. 1 in detail.

According to an aspect of the disclosure a shunt reactor comprising a primary winding 1 and a steel core 2 is presented with reference to FIGS. 1 and 2. The steel core comprises a bottom yoke 3, a top yoke 4, a first core limb 5, a second core limb 6, and a main limb 7. The first core limb 5, the second core limb 6 and the main limb 7 are arranged in parallel and in between the top yoke 4 and the bottom yoke 3 to form a support for a magnetic flux through the steel core 2. The primary winding 1 is wound around the main limb 7 to generate the magnetic flux through the steel core 2. The shunt reactor further comprises an auxiliary winding 8 arranged wound around the bottom yoke 3, top yoke 4, first core limb 5, or second core limb 6, and is configured to generate auxiliary power from the magnetic flux generated by the primary winding 1. The primary 1 and the auxiliary windings 8 are electrically insulated from the steel core 2 and from each other.

The shunt reactor may further comprise a cooling fan 12 configured to be driven by the auxiliary power generated by the auxiliary winding 8.

The shunt reactor may further comprise a tank 10 and cooling radiators 13. The primary winding 1 and the steel core 2, i.e. an active part 9 of the shunt reactor, are arranged inside the tank, and the cooling radiators 13 are arranged on the outside of the tank 10 and are configured to passively cool the tank 10. The cooling fan is configured to increase air circulation through the cooling radiators to improve their cooling efficiency.

The shunt reactor may further comprise a control cabinet 11 arranged outside the tank 10, a feedthrough flange 14 through the tank 10, and a power cable 15 connected to the control cabinet 11 and the auxiliary winding 8. The power cable 15 is arranged through the feedthrough flange 14.

The auxiliary winding 8 may comprise a number of turns around the bottom yoke 3, top yoke 4, first core limb 5, or second core limb 6. The number of turns may be configured depending on a flux density in the steel core 2 and an operating voltage of the cooling fan 12.

The aspect of the disclosure is next described in further detail with reference to FIGS. 1 and 2.

The steel core 2 may be describes as having the shape of the number 8 lying on its side with straight lines. The top yoke 4 is thus arranged upwards from the first 5, second 6 and main 7 limbs, and the bottom yoke 3 is arranged under the first 5, second 6 and main 7 limbs. The steel core 2, comprising the core limb 5, bottom yoke 3, top yoke 4 and main limb 7, is from an electromagnetic perspective seen as an integral piece, even if the different parts typically are manufactured separately and then mounted together.

The control cabinet 11 may be configured to detect a temperature of the shunt reactor and control the cooling fan 12 in dependence thereon. The temperature may be measured in the top of the tank 10 by a temperature sensor 16. The cooling fan 12 may be powered by a direct connection 15 to the auxiliary winding 8 or via the control cabinet 11. In the latter case, voltage control may be applied to the auxiliary power to adapt it to different electric equipment.

Shunt reactors can be seen as two parts, an active part 9 inside the tank 10 and external parts comprising the tank 10 and other external devices and accessories.

The active part 9 is immersed in oil that works as coolant and dielectric insulation media. Heat generated in the primary 1 and auxiliary 8 windings and the steel core 2 is transferred to the oil and the oil exchange the heat with the radiators 13.

The cooling is performed by natural convection in windings/steel core to oil, internally, and from oil to air via tank 10 radiators 13, externally. It is known as Oil Natural Air Natural—ONAN as per international standards.

By installation of the auxiliary winding 8 wounded around the steel core 2 magnetic flux from the primary winding 1 can be utilized.

The steel core 2 of the shunt reactor may e.g. be made by steel sheets and the steel core 2 is the heaviest part of the shunt reactor. The steel core 2 may therefore advantageously be equipped with additional parts and pieces for structural support. Such additional parts and pieces are mainly provided on the sides of the steel core 2, near the first core limb 5 and the second core limb 6, but a clearance generally exist above the tope yoke 4. The auxiliary winding 8 is thus illustrated in such an advantageous position around the top yoke 4, even though the same auxiliary power can be received from positions around the bottom yoke 3, the first core limb 5 and the second core limb 6.

Figure 3:
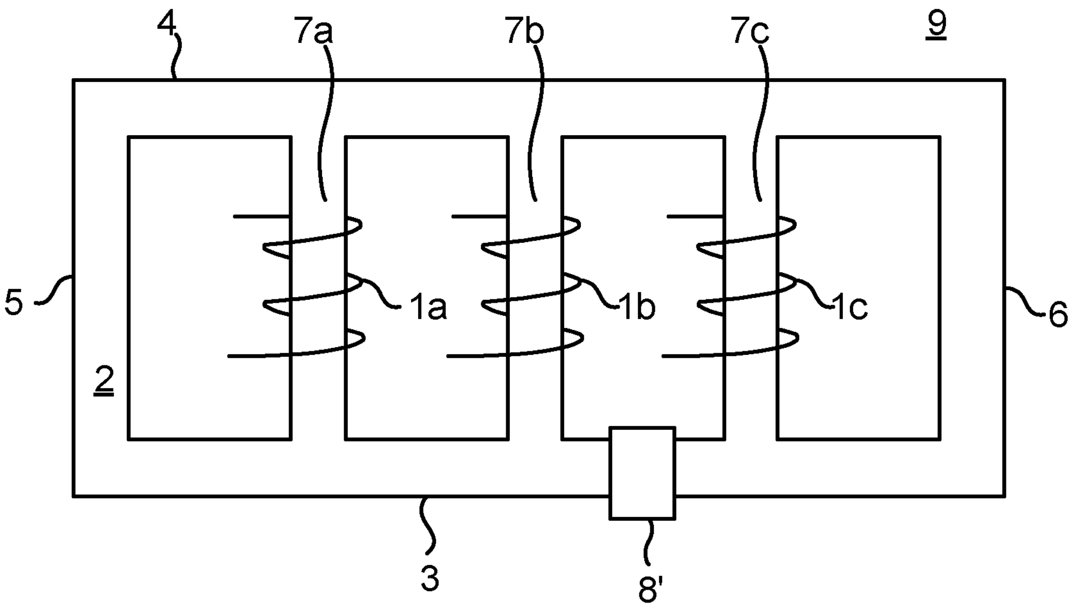
FIG. 3 is a diagram schematically illustrating part of an alternative configuration of the active part of the shunt reactor shown in FIG. 1 in detail.

The active part 9 has with reference to FIGS. 1 and 2 been described for a one-phase application. A three-phase application is presented with reference to FIGS. 1 and 3. The active part 9 is similar for the three-phase application, apart from that the core comprises three parallel main limbs 7*a*, 7*b*, 7*c* between the bottom yoke 3 and top yoke 4, and that the primary winding comprises a winding per phase 1*a*, 1*b*, 1*c*, wound around three main limbs 7*a*, 7*b*, and 7*c*, respectively. The position of the auxiliary winding 8 is further illustrated around the bottom yoke 3 instead of around the top yoke 4, even though the same auxiliary power can be received from positions around the bottom yoke 4, the first core limb 5 and the second core limb 6.

The aspects of the present disclosure have mainly been described above with reference to a few embodiments and examples thereof. However, as is readily appreciated by a person skilled in the art, other embodiments than the ones disclosed above are equally possible within the scope of the disclosure, as defined by the appended patent claims.

The invention claimed is:

1. A shunt reactor comprising a primary winding and a steel core, the steel core comprising a bottom yoke, a top yoke, a first core limb, a second core limb, and a main limb, the first core limb, the second core limb and the main limb arranged in parallel and in between the top yoke and the bottom yoke to form a support for a magnetic flux through the steel core, and the primary winding wound around the main limb to generate the magnetic flux through the steel core;

the shunt reactor further comprising:

an auxiliary winding wound around at least one of the bottom yoke, the top yoke, the first core limb, and the second core limb, and configured to generate auxiliary power from the magnetic flux generated by the primary winding, the primary and the auxiliary windings electrically insulated from the steel core and from each other; and a cooling fan configured to be driven by the auxiliary power generated by the auxiliary winding.

2. The shunt reactor according to claim 1, further comprising a tank, wherein the primary winding and the steel core are arranged inside the tank.

3. The shunt reactor according to claim 2, further comprising a control cabinet arranged outside the tank.

4. The shunt reactor according to claim 1, wherein the auxiliary winding comprises a number of turns around at least one of the bottom yoke, the top yoke, the first core limb, and the second core limb.

5. The shunt reactor according to claim 2, further comprising a plurality of cooling radiators arranged on the outside of the tank and configured to passively cool the tank.

6. The shunt reactor according to claim 5, wherein the cooling fan is configured to increase air circulation through the cooling radiators to improve a cooling efficiency of the cooling radiators.

7. The shunt reactor according to claim 3, further comprising a feedthrough flange through the tank.

8. The shunt reactor according to claim 7, further comprising a power cable connected to the control cabinet and the auxiliary winding, the power cable arranged through the feedthrough flange.

9. The shunt reactor according to claim 4, wherein the number of turns is based on a flux density in the steel core and an operating voltage of the cooling fan.

10. An electric power system comprising:
- a tank;
- a steel core disposed in the tank, the steel core comprising a bottom yoke, a top yoke, a first core limb, a second core limb, and a main limb, the first core limb, the second core limb and the main limb arranged in parallel and in between the top yoke and the bottom yoke to form a support for a magnetic flux through the steel core;
- a primary winding wound around the main limb to generate the magnetic flux through the steel core;
- an auxiliary winding wound around at least one of the bottom yoke, top yoke, first core limb, and second core limb, the auxiliary winding configured to generate auxiliary power from the magnetic flux generated by the primary winding, the primary and the auxiliary windings electrically insulated from the steel core and from each other; and
- a cooling fan configured to be driven by the auxiliary power generated by the auxiliary winding.

11. The system according to claim 10, further comprising a cooling radiator arranged on the outside of the tank and configured to passively cool the tank.

12. The system according to claim 11, wherein the cooling fan is configured to increase air circulation through the cooling radiator to improve a cooling efficiency of the cooling radiator.

13. The system according to claim 10, further comprising a control cabinet arranged outside the tank.

14. The system according to claim 13, further comprising a feedthrough flange through the tank.

15. The system according to claim 14, further comprising a power cable connected to the control cabinet and the auxiliary winding, the power cable arranged through the feedthrough flange.

16. The system according to claim 10, wherein the auxiliary winding comprises a number of turns around at least one of the bottom yoke, the top yoke, the first core limb, and the second core limb.

17. The system according to claim 16, wherein the number of turns is based on a flux density in the steel core and an operating voltage of the cooling fan.

18. A method comprising:
- winding a primary winding around a main limb of a steel core comprising a bottom yoke, a top yoke, a first core limb, a second core limb, and the main limb, the first core limb, the second core limb and the main limb arranged in parallel and in between the top yoke and the bottom yoke to form a support for a magnetic flux through the steel core;
- winding an auxiliary winding around at least one of the bottom yoke, top yoke, first core limb, and second core limb, the auxiliary winding configured to generate auxiliary power from the magnetic flux generated by the primary winding, the primary and the auxiliary windings electrically insulated from the steel core and from each other;
- disposing the steel core in a tank; and
- connecting the auxiliary winding to a cooling fan configured to be driven by the auxiliary power generated by the auxiliary winding.

19. The method according to claim 18, further comprising:
- arranging a cooling radiator on the outside of the tank to passively cool the tank; and
- arranging the cooling fan to increase air circulation through the cooling radiator to improve a cooling efficiency of the cooling radiator.

* * * * *